G. F. BARRON.
FLEXIBLE PIPE JOINT.
APPLICATION FILED JULY 27, 1909.
954,496.
Patented Apr. 12, 1910.
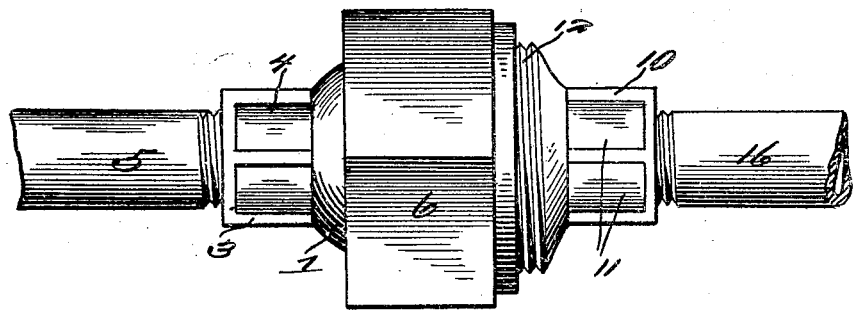
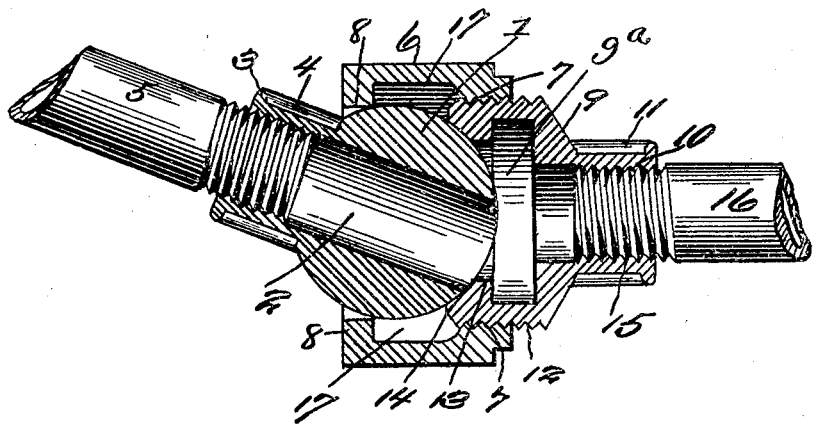

UNITED STATES PATENT OFFICE.

GEORGE F. BARRON, OF PALMYRA, NEW YORK.

FLEXIBLE PIPE-JOINT.

954,496.  Specification of Letters Patent.  Patented Apr. 12, 1910.

Application filed July 27, 1909. Serial No. 509,928.

*To all whom it may concern:*

Be it known that I, GEORGE F. BARRON, of Palmyra, in the county of Wayne and State of New York, have invented a new and useful Improvement in Flexible Pipe-Joints, which improvement is fully set forth in the following specification and shown in the accompanying drawings.

This invention relates to certain new and useful improvements in flexible joints for pipes of that class known as union joints, and, in which is provided a ball and socket joint, or an adjustable ball union, and the present invention has for its objects among others to provide a simplified form of joint of this general character, composed of fewer parts and in which packing is entirely dispensed with.

Union joints for pipes, or "unions" as they are called in the plumbers' trade, are employed to connect or join two sections or stretches of pipe, supposed or intended to be in exact line or coaxial, to form a continuous pipe for conducting a fluid. But it frequently occurs in practice that these sections of pipe are not in true line with each other and when drawn together or connected by a rigid union severe strain is brought upon the parts.

Flexible or universal pipe joints have been devised, but so far as I am aware they have been defective and oftentimes exceedingly troublesome and in some cases practically incapable of satisfactory use. Where the body portion is formed with a flange adapted for use in connection with a packing ring the parts are apt to be screwed together in such a manner as to prevent a tight joint, if the packing be a trifle too thick, and on the other hand if the packing be a trifle thin the parts are apt to be screwed together so firmly as to bind the globular or ball member so tightly that the joint is rendered immovable, and furthermore this is liable to injure the joint between the two spherical bearing surfaces. Where the globular part is made hollow it forms an excellent means of collecting stagnant water which is liable to freeze and then burst the pipe.

I overcome the above objections by my improved flexible joint, and at the same time render it simpler, more efficient and durable in operation and capable of manufacture at a less expense.

I aim further at improvements in the details of construction whereby the desired results are attained in the most satisfactory manner.

Other objects and advantages of the invention will hereinafter appear, and the novel features thereof will be specifically defined by the appended claims.

The invention is clearly illustrated in the accompanying drawings, which, with the numerals of reference marked thereon, form a part of this specification, and in which—

Figure 1 is a side elevation of a flexible joint embodying my present invention. Fig. 2 is a substantially central longitudinal section through the same.

Like numerals of reference indicate like parts in the different views.

Referring to the drawings 1 designates a ball member axially bored to form the passage 2, it being noted that the ball is otherwise solid and not hollow. This ball member has an extension 3 which may be exteriorly roughened to facilitate its being turned, as shown at 4. This extension is interiorly screw threaded for connection with the pipe 5 as seen in Fig. 2.

6 is an annular member having at one end the interior screw threads 7 and at the other end the inwardly extending flange 8.

9 is the other member of the spherical joint. It has an extension 10 which may be exteriorly roughened as seen at 11 to facilitate its being turned. It is exteriorly screw threaded as seen at 12 to engage the screw threads 7 of the middle or annular member as seen in Fig. 2. At its inner end it is formed with the inwardly extending flange 13 which is provided with the concave annular bearing surface 14 which coacts with the adjoining end portion of the ball to form a ground joint. The extension 10 is interiorly screw threaded as seen at 15 to receive the pipe 16, as seen in Fig. 2.

The annular or middle member 6 serves as a band covering the joint between the members 1 and 9. It is to be noted that the member 9 has no flanges or outward projections and that it is free to be screwed into the annular member 6 to any extent desired. It has no coaction whatever with the middle member except as to the screw connection, thus the member 9 is entirely free to be screwed up against the ball member each time just as is necessary to make a water tight joint between the spherical surfaces of the two end members, the joint however being flexible to adapt the coupling to lines of pipe that are not coaxial, and in this way relieving all strain. The middle member serves solely as a holder and nothing more, for the two end members of the coupling which latter coöperate in a spherical joint to make the internal passage through them continuous and water tight. The bore of the ball member is of substantially the same diameter as the diameter of the bore of the pipes coupled by the joint.

It is to be noted that the annular end wall of the middle or annular member is practically in a line at right angles with the axis of said member. By this means there is no tendency to spread this wall on account of the convex surface of the wall or spherical part when the parts are screwed up tightly together, as would be the case were said end wall flaring. By reason of the flangeless nature of the member 9 it can always be screwed up just the right distance to insure a tight joint, without packing, regardless of the wear upon the parts by use. The bearing of the ball upon the concave surface 14 and upon the straight-lined wall of the flange 8 is not in the same line, but the one is out of axial alinement with the other, and by reason of the presence of the annular recess or chamber 17 seen in Fig. 2 the bearings are quite widely separated and friction is thus decreased. As will be clearly seen upon reference to Fig. 2, the member 9 is formed with an annular chamber 9ª adjacent its flange and adjacent the concave annular bearing surface 14 into which any sediment from the ball member 1 will be deposited and retained but from which it may be readily removed when desired.

What is claimed as new is:—

1. In a metallic flexible pipe-joint, a ball member solid but for an axial bore and having an interiorly threaded extension, an annular member having an integral inturned flange with its inner wall in a line at right angles to its axis and upon which said ball has a bearing, and a member having unlimited threaded engagement with said annular member and having at one end an interiorly threaded extension and at the other end an inturned flange with concave bearing surface within said annular member for coöperation with the ball, the bearings of the ball upon said concave surface and right-lined wall of said flange being out of axial alinement with each other, whereby the bearings are widely separated and an annular chamber formed therebetween.

2. In a metallic flexible pipe-joint, a ball member solid but for an axial bore and having an interiorly threaded extension, an annular member having an integral inturned flange with its inner wall in a line at right angles to its axis and upon which said ball has a bearing, and a member having unlimited threaded engagement with said annular member and having at one end an interiorly threaded extension and at the other end an inturned flange with concave bearing surface within said annular member for coöperation with the ball, the bearings of the ball upon said concave surface and right-lined wall of said flange being out of axial alinement with each other, whereby the bearings are widely separated and an annular chamber formed therebetween, the member with the concave bearing being formed with an annular chamber adjacent thereto.

In witness whereof, I have hereunto set my hand this 26th day of July, 1909, in the presence of two subscribing witnesses.

GEORGE F. BARRON.

Witnesses:
  E. B. WHITMORE,
  A. M. WHITMORE.